US012669373B2

(12) United States Patent
Xu et al.

(10) Patent No.: US 12,669,373 B2
(45) Date of Patent: Jun. 30, 2026

(54) PHOTOELECTRIC SENSOR CAPABLE OF RESISTING HIGH-FREQUENCY LIGHT INTERFERENCE

(71) Applicant: SHANGHAI LANBAO SENSING TECHNOLOGY CO., LTD., Shanghai (CN)

(72) Inventors: Yongtong Xu, Shanghai (CN); Yong Xie, Shanghai (CN); Dugui Zhao, Shanghai (CN); Hongguang Wei, Shanghai (CN); Xingxing Jiang, Shanghai (CN); Chengsong Zhou, Shanghai (CN)

(73) Assignee: SHANGHAI LANBAO SENSING TECHNOLOGY CO., LTD., Shanghai (CN)

( * ) Notice: Subject to any disclaimer, the term of this patent is extended or adjusted under 35 U.S.C. 154(b) by 210 days.

(21) Appl. No.: 18/557,594

(22) PCT Filed: Aug. 31, 2022

(86) PCT No.: PCT/CN2022/116035
§ 371 (c)(1),
(2) Date: Oct. 27, 2023

(87) PCT Pub. No.: WO2023/030357
PCT Pub. Date: Mar. 9, 2023

(65) Prior Publication Data
US 2024/0210242 A1     Jun. 27, 2024

(30) Foreign Application Priority Data

Aug. 31, 2021     (CN) .......................... 202111009222.6
Aug. 31, 2021     (CN) .......................... 202111009224.5

(51) Int. Cl.
*G01J 1/44*          (2006.01)
*G01J 1/42*          (2006.01)

(52) U.S. Cl.
CPC ............... *G01J 1/44* (2013.01); *G01J 1/4204* (2013.01); *G01J 2001/4242* (2013.01); *G01J 2001/444* (2013.01)

(58) Field of Classification Search
CPC .... G01J 1/44; G01J 1/4204; G01J 2001/4242; G01J 2001/444; G01J 1/4228;
(Continued)

(56) References Cited

U.S. PATENT DOCUMENTS 7,738,935 B1 * 6/2010 Turcott ................ A61B 5/0261
600/336

FOREIGN PATENT DOCUMENTS

CN          104156682          11/2014
CN          108627881          10/2018
(Continued)

OTHER PUBLICATIONS

"International Search Report (Form PCT/ISA/210) of PCT/CN2022/ 116035", mailed on Nov. 30, 2022, with English translation thereof, pp. 1-6.

*Primary Examiner* — Georgia Y Epps
*Assistant Examiner* — Monica T Taba
(74) *Attorney, Agent, or Firm* — JCIPRNET

(57) ABSTRACT

The disclosure provides a photoelectric sensor capable of resisting high-frequency light interference. It comprises a transmitting tube, double receiving tubes, a filter arranged at the front ends of the double receiving tubes for filtering optical signals, a band-pass filter circuit coupled to the double receiving tubes, a differential amplifier coupled to the band-pass filter circuit, a control module for controlling the synchronous receiving of optical signals, and a sensor hys-
(Continued)

teresis error setting system for improving the anti-interference performance of sensors; the control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid.

9 Claims, 4 Drawing Sheets

(58) Field of Classification Search
CPC .. H03K 17/941; H03K 17/968; H03K 17/943; G01S 7/4816; G01S 17/04; G05B 19/042
See application file for complete search history.

(56) References Cited

FOREIGN PATENT DOCUMENTS

| | | | | |
|---|---|---|---|---|
| CN | 109655810 | | 4/2019 | |
| CN | 110132323 | | 8/2019 | |
| CN | 110132323 A | * | 8/2019 | ............... G01D 5/26 |
| CN | 113721517 | | 11/2021 | |
| CN | 113726982 | | 11/2021 | |
| DE | 10318763 A1 | * | 11/2003 | ............ G01S 17/04 |
| EP | 3557286 | | 10/2019 | |

* cited by examiner

Normal signal

◉ Desired signal sampling position

△ Interference signal sampling position

Interference signal

PHOTOELECTRIC SENSOR CAPABLE OF RESISTING HIGH-FREQUENCY LIGHT INTERFERENCE

CROSS-REFERENCE TO RELATED APPLICATION

This application is a 371 of international application of PCT application serial no. PCT/CN2022/116035, filed on Aug. 31, 2022, which claims the priority benefit of China application no. 202111009224.5 and no. 202111009222.6, filed on Aug. 31, 2021. The entirety of each of the above mentioned patent applications is hereby incorporated by reference herein and made a part of this specification.

TECHNICAL FIELD

The invention relates to a photoelectric sensor, and especially relates to a photoelectric sensor capable of resisting high-frequency light interference.

BACKGROUND ART

A photoelectric sensor collects and detects signals by means of optical signals transmitting and receiving and photoelectric conversion. When the ambient light irradiates to the receiving end of a photoelectric sensor, especially high-frequency interference light, desired signals will superimpose with interference signals, and the amplitude may either increase or decrease. Therefore, a conventional photoelectric sensor receiver is unable to recognize desired signals correctly, resulting in sensor misjudgment and other abnormal phenomena.

According to the prior art, a capacitor is generally added downstream of the receiving tube, which can effectively attenuate the interference of low-frequency light sources such as sunlight and incandescent lights. However, for high-frequency light sources, such as energy-saving lights and LED lights, the working frequency generally falls between 20K~100 KHz, and even between 1 M~2 MHz. Therefore, even though a capacitor is added, the high-frequency light interference, and especially, the interference of similar frequency between interference signals and desired signals cannot be eliminated.

Alternatively, a narrow gap is added on a conventional photoelectric sensor, i.e., by adding an opaque cover on the surface of the photoelectric sensor and just leaving a small hole to block ambient light. But desired signals will also be blocked, which results in serious attenuation of sensor detection range, and impacts the normal operation of sensors.

Traditional solutions cannot effectively solve the interference of high-frequency light sources, so the application of photoelectric sensors is limited.

For proximity switch sensor products (including photoelectric sensors), adding hysteresis error can significantly improve the anti-interference performance, avoiding the output jitter of products. If there is no hysteresis error, proximity switch output jitter may occur when the detection object is in the sensing position. In the previous art, the proximity switch is usually set with a fixed and balanced return hysteresis error at the rated distance, which meets the hysteresis error requirements of both small and large ranges. However, the requirement for proximity switch sensors in industrial automation is getting higher and higher, with the detection distance getting longer, and the detection sensitivity getting higher. Setting a fixed hysteresis error as in the past can not meet the requirement of large-range products. Especially for those products with distance adjustment and covering both small and large ranges. Fixed hysteresis error can not take into account both the minimum and the maximum range. thus affecting the use of products, in some serious cases, resulting in output jitter or blocking of proximity switches, and threatening normal automated production.

CONTENTS OF THE INVENTION

The invention aims at providing a photoelectric sensor capable of resisting high-frequency light interference, which is featured by high interference resistance, capable of avoiding output misjudgment, stable and reliable operating and wider application range; it can set different hysteresis errors to different ranges, meets the requirements of large-range product at different range hysteresis errors, so that the sensor is more stable and reliable.

The technical purpose of the invention is realized through the following technical scheme:

A photoelectric sensor capable of resisting high-frequency light interference, comprising a transmitting tube for transmitting laser light source as modulated optical signals, double receiving tubes for receiving optical signals, a filter arranged at the front ends of the double receiving tubes for filtering optical signals, a band-pass filter circuit coupled to the double receiving tubes, a differential amplifier coupled to the band-pass filter circuit, and a control module for controlling the double receiving tubes to receive the optical signals synchronously with the transmitting tube;

The control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid.

Furthermore, a photoelectric sensor capable of resisting high-frequency light interference, comprising a transmitting tube for transmitting laser light source as modulated optical signals, double receiving tubes for receiving optical signals, a filter arranged at the front ends of the double receiving tubes for filtering optical signals, a band-pass filter circuit coupled to the double receiving tubes, a differential amplifier coupled to the band-pass filter circuit, a control module for controlling the double receiving tubes to receive the optical signals synchronously with the transmitting tube, and a sensor hysteresis error setting system for improving the anti-interference performance of sensors;

The control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid;

The sensor hysteresis error setting system comprises amplifier I for receiving input signals and primary amplification, a potentiometer coupled to the output end of amplifier I for adjusting the proximity switch range, amplifier II coupled to the regulating output end of the potentiometer for secondary amplification of the received signals, a high-impedance voltage follower connected in parallel to amplifier II, and a Microcontroller Unit (MCU) coupled to amplifier II and the output end of the voltage follower for controlling and setting return error;

The potentiometer adjusts the output voltage division ratio according to the proximity switching range, and the MCU calculates the output hysteresis error value according to the range signal output from the voltage follower.

Preferably, the transmitting tube and the double receiving tubes are coupled to the control module; the control module responds to drive signals from the transmitting tube, and the control module sends collection signals to control the double receiving tubes to collect optical signals in synchronization with driving signals.

Preferably, the control module samples ambient light interference signals cycle by cycle, and the sampling position is located in the interval between two optical signal collections.

Preferably, the optical lens I for converging modulated optical signals transmitted is arranged in the front end of the transmitting tube.

Preferably, the optical lens II is arranged between the receiving front end of the double receiving tubes and the filter.

Preferably, the filter is a band-pass filter with the same band as the modulated optical signal transmitted.

Preferably, the MCU calculates the output hysteresis error specifically as follows:

$$y = m^* x^{-n} + k;$$

where, x is the range signal variable transmitted by the voltage follower, y is the hysteresis error, m and n are fixed coefficients, and k is the intercept.

Preferably, the MCU reads output signals of the amplifier II and the voltage follower cycle by cycle.

A hysteresis error setting method for a photoelectric sensor capable of resisting high-frequency light interference, comprising a transmitting tube for transmitting laser light source as modulated optical signals, double receiving tubes for receiving optical signals, a filter arranged at the front ends of the double receiving tubes for filtering optical signals, a band-pass filter circuit coupled to the double receiving tubes, a differential amplifier coupled to the band-pass filter circuit, a control module for controlling the double receiving tubes to receive the optical signals synchronously with the transmitting tube, and a sensor hysteresis error setting system for improving the anti-interference performance of sensors;

The control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid;

Comprising the following steps:

The adjusting potentiometer adjusts the range by adjusting the voltage division ratio;

Input signals, after amplification and voltage division, will be amplified by the amplifier, then the amplifier outputs detection signals to the MCU, and the voltage follower outputs range signals to the MCU;

The MCU receives range signals and calculates and sets hysteresis error according to the set algorithm To sum up, the invention has the following advantages:

For hardware configuration, the photoelectric sensor adopts double receiving tubes, combined with a band-pass filter circuit and a differential amplifier, it can distinguish ambient light signals from laser as modulated optical signals uniformly irradiating on the dual receiving tubes, and most of the ambient light signals can be identified as common mode signals and then filtered, which effectively filters out the low- and high-frequency interference signals and leaves the desired signals; The control module controls the double receiving tube to collect signals in synchronization with the drive signals of the transmitting tube, and collects the ambient light interference signals at the same time. When interference signals have a wavelength similar to that of modulated optical signals, it can determine the existence of interference so as to avoid product malfunction.

The potentiometer adjusts the voltage division ratio for range setting, the high-impedance voltage follower outputs the range signal, and the MCU calculates and sets the hysteresis error in a real-time manner. The range signal can be transmitted to the MCU in real time, and the MCU can read the range signal without affecting signal processing. The range signal is regarded as a variable, after calculation, a hysteresis error will be output, and the hysteresis error is related to the range, realizing the requirement of setting different hysteresis errors for different ranges, and meeting the requirement of setting hysteresis errors for different ranges of large-range products.

DESCRIPTION OF EMBODIMENTS

The invention will be further described in detail with the drawings.

A photoelectric sensor generally comprises a transmitter and a receiving tube. The transmitter is mainly used to modulate and transmit red right and infrared light sources. When there is a detection object, the modulated optical signals are reflected to the receiver, the receiver amplifies and compares the signals, and outputs action signals. With the development of science and technology, photoelectric sensors are applied to more and more occasions. Different industrial occasions have different lighting sources, including sunlight, incandescent lights, fluorescent lights, LED energy-saving lights, halogen lights, high-pressure sodium lights and so on. These light sources have different operating frequencies, including DC components, 50 Hz~60 Hz power frequency signals, 20K~100 KHz high-frequency, and 1 M~2 MHz high-frequency lights. These light sources have a wide frequency range, and cover visible light, ultraviolet light, and infrared light.

Figure 1:
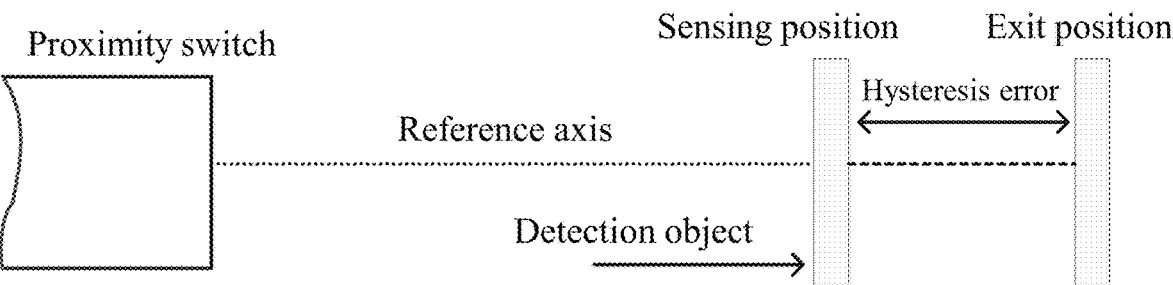
FIG. 1 is the schematic diagram of the hysteresis error value of the proximity switch.
Figure 2:
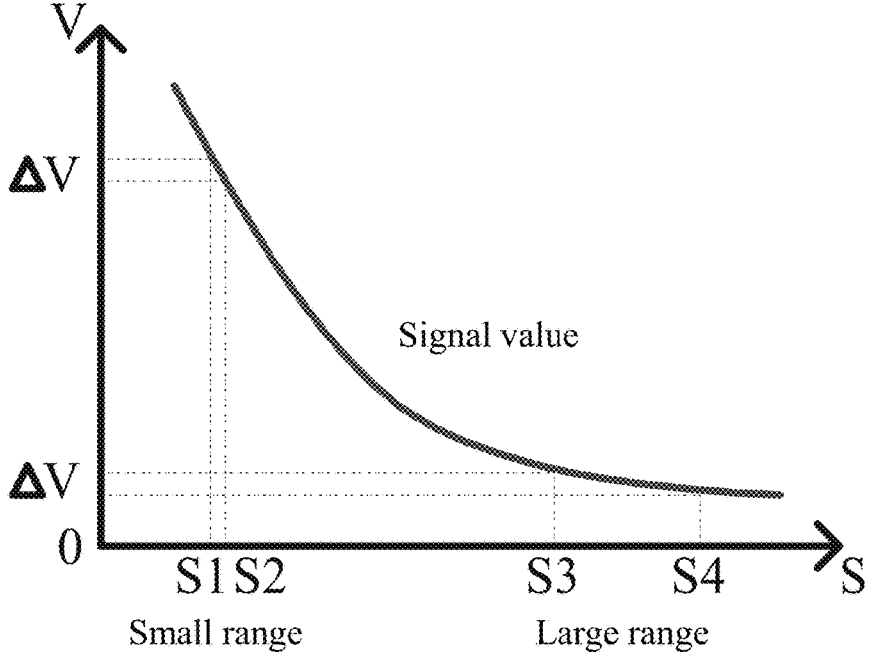
FIG. 2 is the relation diagram between signal strength and distance.

As shown in FIG. 1 and FIG. 2, in general, the signal strength of a proximity switch relates to the distance, and signals are in nonlinear trend change, similar to a power function. If a fixed signal value ΔV is set as hysteresis, it can be seen that the hysteresis error for a product with a small range H1=(S2−S1)/S1*100%, and a too small H1 may cause the output jitter of the product. Large range H2=(S4−S3)/S3*100%, a too large H2 may cause product output blocking. It can be seen that there is a large difference between the hysteresis error of products with a small range and of those with a large range. In serious cases, small-range products are subjected to the risk of output jitter if the hysteresis error is too small, and large-range product is subjected to the risk of output blocking if the hysteresis error is too large, which affects the normal use of large-range products.

Figure 3:
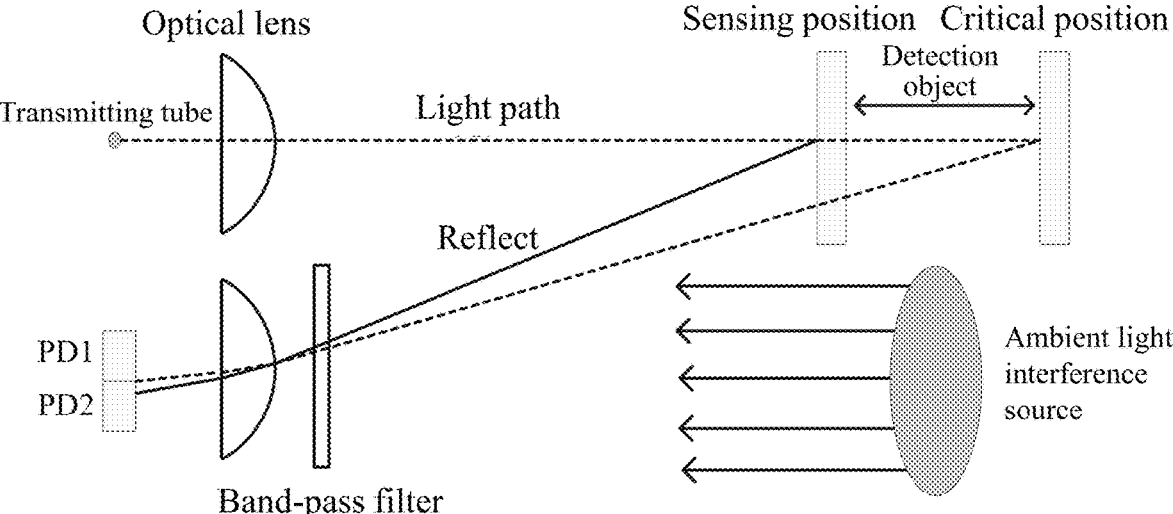
FIG. 3 is the structural diagram of the Embodiment.
Figure 4:
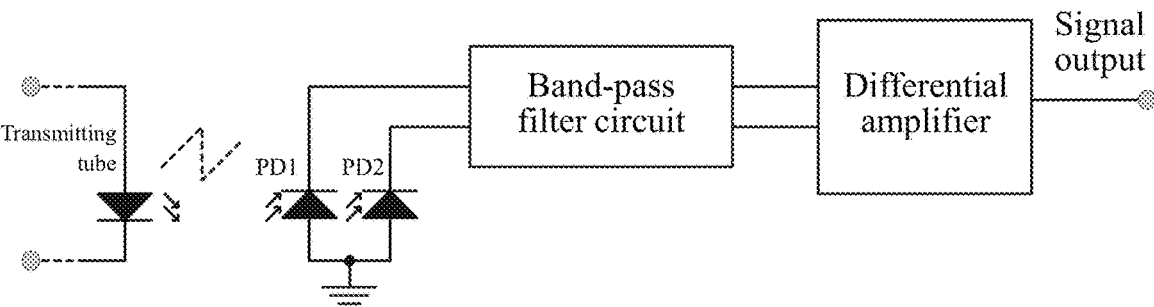
FIG. 4 is the local section view of the embodiment shown in FIG. 1.

According to one or more embodiments, it discloses a photoelectric sensor capable of resisting high-frequency light interference, as shown in FIG. 3 and FIG. 4, comprising a transmitting tube, double receiving tubes, and a filter arranged at the receiving front ends of the double receiving tubes; and also comprises a band-pass filter circuit coupled to the double receiving tubes, a differential amplifier coupled to the band-pass filter circuit, and a control module for controlling the double receiving tubes to receive the optical signals synchronously with modulated optical signal collection by the transmitting tube, and for sampling ambient light interference signals according to the settings. An optical lens I is arranged at the transmitting front end of the transmitting tube, which is a plano-convex lens, and the plane is located on one side of the transmitting front end of the transmitting tube to converge and adjust modulated optical signals; An optical lens II is arranged between the receiving front end of the double receiving tubes and the filter, which is also a plano-convex lens, and the plane is located on one side of the receiving front end of the receiving tube.

The transmitting tube uses a laser as the VCSEL light source to transmit modulated light signals, after passing through the optical lens I, the light spot becomes smaller and the energy is more concentrated. The filter selected is a band-pass filter with the same band as modulated optical signals, and is set at the receiving front end of the double receiving tubes. The filter has high transmittance to the light with the same wavelength as that of the transmitting tube, and has low transmittance to the light in other bands with a longer or shorter wavelength so that most of the interference signals of different bands of ambient light can be filtered out. The undesired light in the same band needs further processing.

Under normal circumstances, the transmitting light spot of the photoelectric sensor is much smaller than the area of the ambient light source. Therefore, the ambient light can be equivalent to the area light source, when the ambient light source is projected to the receiving tube through the band-pass filter and the optical lens II, and the ambient light signals uniformly irradiate on the two receiving tubes PD1 and PD2, the signals can be considered as common mode signals. The band-pass filter circuit can filter out low-frequency signals, such as power frequency incandescent lights, sunlight, and other low-frequency signals; it can also attenuate signals with frequency considerably higher than modulated optical frequency. Signals, after filtering, are differentially amplified. An excellent circuit differential amplification can filter out most of the common mode interference sources and amplify differential mode signals. As limited by manufacturing technologies, complete consistency among receiving tubes, differential amplifiers, and peripheral circuits is impossible, therefore a small amount of the interference signals will be amplified, thus other processing measures are required.

Since there are a great variety of light sources, and the light source band is wide, light sources in the same band as that of the transmitting tube can pass through the filter, interference signals of the ambient light still exist even after differential amplification, but the interference component will decrease significantly, so that desired signals will not be completely overlaid by interference signals. At this time, use the software to sample and identify the ambient light. When ambient light interference exists, process with the software.

The control module responds to drive signals from the transmitting tube, and the control module sends collection signals to control the double receiving tubes to collect optical signals in synchronization with driving signals by time. Signals in the transmitting tube are modulated optical signals, the reading of modulation signals and receiving signals is controlled by a Microcontroller Unit (MCU), realizing the simultaneous design of transmitting and receiving. Take the transmitting tube driving signal as the make bit, determine the sampling time point when signals exist by sampling signals by time, and turn on the receiving conversion circuit composed of double receiving tubes for signal collection, in order to improve the anti-interference ability, the window time for enabling signal sampling is relatively short. The transmitting communication signal is narrower, and the window time for desired signal collection is reduced, which can further improve the anti-interference ability.

Figure 5:
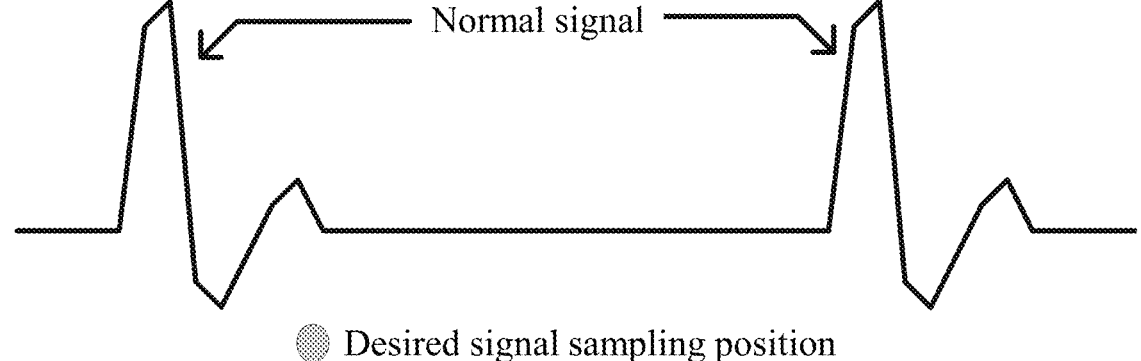
FIG. 5 is the schematic diagram of the ambient light interference receiver.
Figure 5:
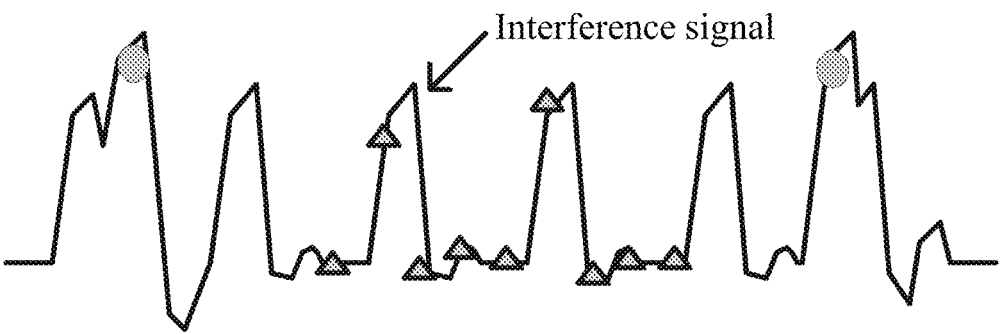

As shown in FIG. 5, ambient optical interference signals are sampled cycle by cycle, and the sampling position is located in the interval between desired signals. After several times of samplings, interference signals can be collected. When the amplitude of the sampled interference signals is greater than the set interference signal threshold, the ambient optical interference mode will be triggered. At this time, even if some desired signals are lower than the threshold after the interference signal is overlaid, the signals will be discarded to avoid the output jitter or misjudgment of the product.

The photoelectric sensor can work reliably and stably with high-frequency light sources such as fluorescent lights and LED lights, thus the products have wider applications.

Figure 6:
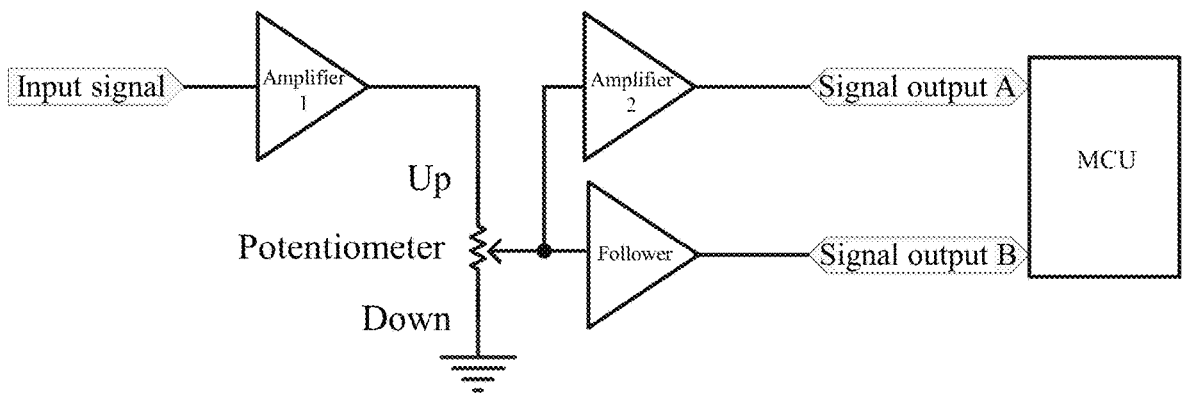
FIG. 6 is the schematic diagram of the system.

As shown in FIG. 6, the photoelectric sensor also includes a sensor hysteresis error setting system for improving sensor anti-interference performance, which comprises an amplifier I, a potentiometer, an amplifier II, a voltage follower, and an MCU.

The amplifier I receives input signals and amplifies input signals preliminarily. the potentiometer is coupled to the output end of the amplifier 1 for adjusting and setting the range of the proximity switch; The amplifier II is coupled to the adjusting output end of the potentiometer, and the voltage follower is connected in parallel to the amplifier II. Through the voltage division and adjustment by the potentiometer, the amplifier II outputs the amplified receiving signals, i.e., signal output A; The voltage follower is of high impedance and is connected in parallel to the output range signals of amplifier II, i.e., signal output B; The MCU is coupled to the output end of the amplifier II and the voltage follower, responds to receiving signals and range signals, and sets for the control-level hysteresis error calculation.

The hardware circuit is designed to two-stage amplification, signals are input to the amplifier I for amplification, and a potentiometer is connected to the output end of the amplifier I for different voltage divisions. After voltage division, the signals are used as inputs to the amplifier II and the voltage follower, since the voltage follower is of high impedance type, the influence on signals can be ignored. Through the adjustment by the potentiometer, different voltage division ratios can be achieved. As shown in FIG. 6, when the potentiometer is adjusted to the top position, the amplifier II and the voltage follower have the highest voltage division ratio, and the largest range. When the potentiometer is adjusted to the bottom position, the amplifier II and the voltage follower have the lowest voltage division ratio, and the smallest range. The range signal output B is output to the MCU through the voltage follower, and the MCU sets the hysteresis error after signal calculation and processing. Since the range adjustment is realized through the potentiometer, a change in the resistance value of the potentiometer will cause the corresponding change of the signal output B of the voltage follower, so that the MCU can read the range signal in real time. The MCU takes the signal output B of the voltage follower as a variable x, and completes the calculation according to the formula $$y = m^* x^{-n} + k,$$

where y is the hysteresis error, m and n are fixed coefficients, and k is the intercept. It can be seen from this algorithm that the hysteresis error is also a power function. Where, the three coefficients m, n and k are related to product characteristics and are calculated by collecting samples.

The MCU reads signal output A and signal output B by time, and the two signals are read cycle by cycle, characterized by real-time and high response. So long as the range signal changes, the hysteresis error will change accordingly, ensuring that the hysteresis error changes dynamically with the range.

Figure 7:
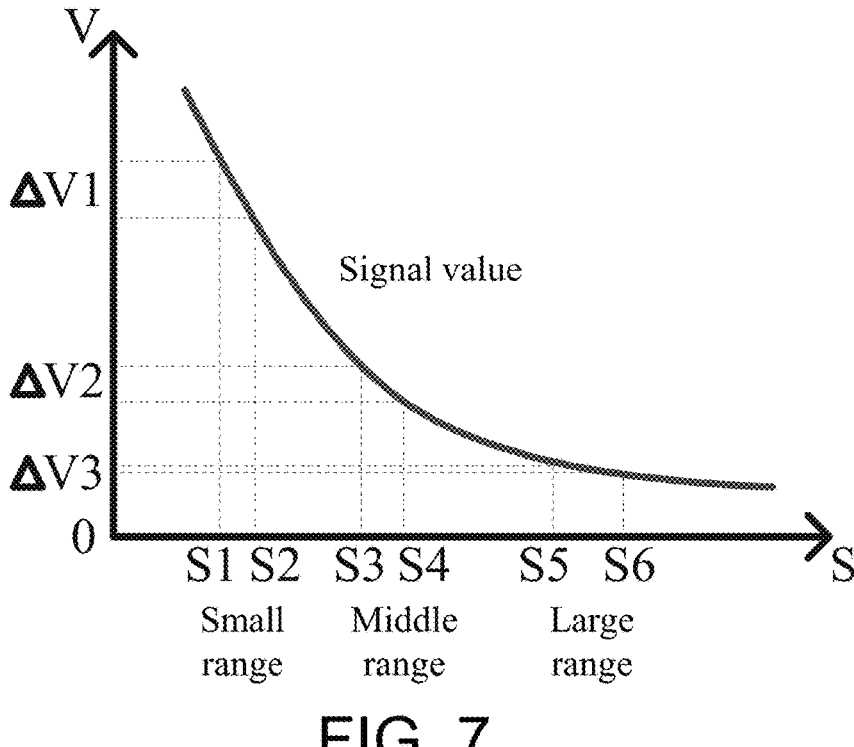
FIG. 7 is the diagram of different ranges corresponding to different hysteresis errors

For a proximity switch with a large range, when it is adjusted to a small range, the signal output B of the voltage follower changes along with the potentiometer, as shown in FIG. 7. $\Delta V1$ is the hysteresis of the small range, and the hysteresis error at this time is H1=(S2–S1)/S1*100%. When the potentiometer is adjusted to the middle range, $\Delta V2$ is the hysteresis of the middle range, and the hysteresis error at this time is H2=(S4–S3)/S3*100%. When the potentiometer is adjusted to the large range, $\Delta V3$ is the hysteresis of the large range, and the hysteresis error at this time is H3=(S6–S5)/S5*100%. It can be seen that the hysteresis error for different ranges is different, realizing different hysteresis errors for different ranges, which meets the requirements of different hysteresis error setting of large-range products, and widens the product application.

The circuit is designed to transmit the range signal to the MCU in real time, and the MCU can read the range signal without affecting signal processing. MCU takes the range signal as a variable and outputs a hysteresis error after internal processing. The hysteresis error is related to the range, which realizes the requirement of setting different hysteresis errors for different ranges, meeting the requirement of large-range products of setting hysteresis errors for different ranges. Different hysteresis errors can be set according to the ranges of the product, so that the hysteresis error can be set to an optimal value no matter whether the product is set to the small range, the medium range, or the large range.

According to one or more embodiments, it discloses a photoelectric sensor capable of resisting high-frequency light interference according to Claim 1, wherein, it comprises a transmitting tube for transmitting laser light source as modulated optical signals, double receiving tubes for receiving optical signals, a filter arranged at the front ends of the double receiving tubes for filtering optical signals, a band-pass filter circuit coupled to the double receiving tubes, a differential amplifier coupled to the band-pass filter circuit, a control module for controlling the double receiving tubes to receive the optical signals synchronously with the transmitting tube, and a sensor hysteresis error setting system for improving the anti-interference performance of sensors.

The control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid.

It comprises the following steps:

The adjusting potentiometer adjusts the range by adjusting the voltage division ratio;

Input signals, after amplification and voltage division, will be amplified by the amplifier, then the amplifier outputs detection signals to the MCU, and the voltage follower outputs range signals to the MCU;

The MCU receives range signals and calculates and sets hysteresis error according to the set algorithm.

The specific embodiment just illustrates the invention, but does not limit the invention. A person skilled in the art may make non-inventive modifications to this embodiment as required after reading through the Description, all those contained in the scope of claims are protected by the patent law.

What is claimed is:

1. A photoelectric sensor capable of resisting high-frequency light interference, wherein it comprises a transmitting tube for transmitting laser light source as modulated optical signals, double receiving tubes for receiving optical signals, a filter arranged at front ends of the double receiving tubes for filtering optical signals, a band-pass filter circuit coupled to the double receiving tubes, a differential amplifier coupled to the band-pass filter circuit, and a control module for controlling the double receiving tubes to receive the optical signals synchronously with the transmitting tube;

the control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid;

and further comprising a sensor hysteresis error setting system, the sensor hysteresis error setting system including:

a Microcontroller Unit (MCU) and a high-impedance voltage follower, wherein the MCU is configured to calculate an output hysteresis error specifically as follows:

$$y = m^* x^{-n} + k;$$

where, x is a range signal variable transmitted by the voltage follower, y is the hysteresis error, m and n are fixed coefficients, and k is an intercept.

2. A photoelectric sensor capable of resisting high-frequency light interference according to claim 1, wherein it comprises a transmitting tube for transmitting laser light source as modulated optical signals, double receiving tubes for receiving optical signals, a filter arranged at the front ends of the double receiving tubes for filtering optical signals, a band-pass filter circuit coupled to the double receiving tubes, a differential amplifier coupled to the band-pass filter circuit, a control module for controlling the double receiving tubes to receive the optical signals synchronously with the transmitting tube, and a sensor hysteresis error setting system for improving an anti-interference performance of sensors;

the control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid;

the sensor hysteresis error setting system comprises a first amplifier for receiving input signals and primary amplification, a potentiometer coupled to an output end of the first amplifier for adjusting a proximity switch range, a second amplifier coupled to a regulating output end of the potentiometer for secondary amplification of the received signals, a high-impedance voltage follower connected in parallel to the second amplifier, and a Microcontroller Unit (MCU) coupled to the second amplifier and an output end of the voltage follower for controlling and setting return error;

the potentiometer adjusts an output voltage division ratio according to the proximity switching range, and the MCU calculates an output hysteresis error value according to a range signal output from the voltage follower.

3. A photoelectric sensor capable of resisting high-frequency light interference according to claim 1, wherein the transmitting tube and the double receiving tubes are coupled to the control module; the control module responds to drive signals from the transmitting tube, and the control module sends collection signals to control the double receiving tubes to collect optical signals in synchronization with driving signals by time.

4. A photoelectric sensor capable of resisting high-frequency light interference according to claim 3, wherein the control module samples ambient light interference signals cycle by cycle, and the sampling position is located in an interval between two optical signal collections.

5. A photoelectric sensor capable of resisting high-frequency light interference according to claim 1, wherein an optical lens I for converging modulated optical signals transmitted is arranged in a front end of the transmitting tube.

6. A photoelectric sensor capable of resisting high-frequency light interference according to claim 5, wherein an optical lens II is arranged between a receiving front end of the double receiving tubes and the filter.

7. A photoelectric sensor capable of resisting high-frequency light interference according to claim 1, wherein the filter is a band-pass filter with the same band as the modulated optical signal transmitted.

8. A photoelectric sensor capable of resisting high-frequency light interference according to claim 2, wherein the MCU reads output signals of the second amplifier and the voltage follower cycle by cycle.

9. A hysteresis error setting method for a photoelectric sensor capable of resisting high-frequency light interference, wherein it comprises a transmitting tube for transmitting laser light source as modulated optical signals, double receiving tubes for receiving optical signals, a filter arranged at front ends of the double receiving tubes for filtering optical signals, a band-pass filter circuit coupled to the double receiving tubes, a differential amplifier coupled to the band-pass filter circuit, a control module for controlling the double receiving tubes to receive the optical signals synchronously with the transmitting tube, and a sensor hysteresis error setting system for improving an anti-interference performance of sensors;

the control module further collects and obtains ambient light interference signals and sets an interference signal threshold value, and when it is detected that the amplitude of the collected ambient light interference signals is larger than the set interference signal threshold value, the control module discards the light signals lower than the interference signal threshold value after the interference signals are overlaid;

wherein the sensor hysteresis error setting system comprises a first amplifier, a potentiometer, a second amplifier, a voltage follower, and a Microcontroller Unit (MCU);

comprising the following steps:

the potentiometer adjusts the range by adjusting a voltage division ratio;

input signals, after amplification and voltage division, will be amplified by the second amplifier, then the second amplifier outputs detection signals to the MCU, and the voltage follower outputs range signals to the MCU;

the MCU receives range signals and calculates and sets hysteresis error according to a set algorithm specifically as follows:

$$y=m*x^{-n}+k;$$

where, x is a range signal variable transmitted by the voltage follower, y is the hysteresis error, m and n are fixed coefficients, and k is an intercept.

* * * * *